INVENTORS
ANTHON A. LEONARD
THOMAS ALLAN
WILLY BORBERG

BY H. L. Mackey
ATTORNEY.

Jan. 31, 1956 A. A. LEONARD ET AL 2,733,434

CATHODE RAY TUBE MOUNTING

Filed Aug. 12, 1952 3 Sheets-Sheet 2

INVENTORS.
ANTHON A. LEONARD
THOMAS ALLAN
WILLY BORBERG
BY
H. A. Mackey
ATTORNEY.

INVENTORS.
ANTHON A. LEONARD
THOMAS ALLAN
WILLY BORBERG
BY H. S. Mosley
ATTORNEY.

United States Patent Office 2,733,434

Patented Jan. 31, 1956

2,733,434

CATHODE RAY TUBE MOUNTING

Anthon A. Leonard, Hastings, Thomas Allan, Hawthorne, and Willy Borberg, North White Plains, N. Y., assignors to General Precision Laboratory Incorporated, a corporation of New York Application August 12, 1952, Serial No. 304,044

9 Claims. (Cl. 340—367)

This invention relates to arrangements for mounting a cathode ray tube in an optical system for large screen projection and more specifically relates to arrangements wherein rapid tube replacement in an optical system requiring precise tube positioning is greatly facilitated.

This invention is particularly applicable to large screen projection television receivers for use in theatres, but it is also applicable to any system for the optical magnification and projection upon a screen of the luminous pattern of a cathode ray tube, without any limitation upon the method of generation of the signals producing the luminous pattern or upon the nature of the pattern or picture.

Consequent upon the successful development of cathode ray tubes having adequate screen luminosity, theatre screen television has become practical as a new art. In this art the television picture as received at the screen of the picture tube is optically enlarged and projected upon a large screen for viewing by a theatre audience. However, in order to meet present motion picture theatre standards it becomes necessary to reduce or eliminate all possibility of program interruptions. One possible cause of program interruption is due to failure of the picture tube, and it therefore becomes highly desirable to change picture tubes quickly. The requirements of the projection optical system are so strict, however, that each picture tube must be individually positioned and adjusted in the optical system in which it is to be used, individual tube manufacturing tolerances being too great for complete interchangeability in such an opical system without individual adjustment.

In order to eliminate the time delay entailed by individual adjustment at the time of tube replacement, the present invention provides a mechanical support design that allows preadjustment of a replacement tube. Upon tube failure, replacement can then be effected substantially without further adjustment, and presentation can be continued immediately without preliminary inspection of the picture projected by the replacement tube.

One purpose of this invention, therefore, is to provide a design of projection picture tube support that is preadjustable and that permits rapid tube replacement.

A more specific purpose of this invention is to provide a design of projection picture tube support that permits adjustment of the tube with relation to the projection optical system before permanent installation therein.

Another purpose of this invention is to provide a design of projection picture tube support that permits rapid tube replacement with elimination of operational adjustment at the time of replacements.

A further understanding of this invention may be secured from the detailed description and accompanying drawings, in which.

Figure 1:
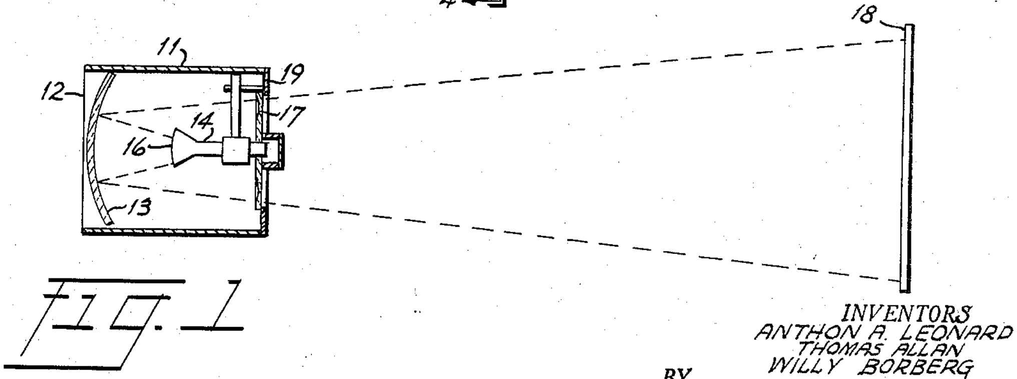
Figure 1 is an elevation view of large-screen television projection apparatus.

Referring now to Fig. 1, the barrel of a television large screen projector is indicated at 11. The end 12 is substantially closed by a spherical reflector 13. A cathode ray tube of appropriate type is indicated at 14 with its curved luminous screen 16 facing the reflector 13. The centers of curvature of both the screen 16 and the reflector 13 are at the same point, which lies in the axis of the picture tube at approximately the center of its length. A Schmidt corrector lens 17 is placed transversely at approximately the center of curvatures, so that light emanating from the screen or luminous face 16 is reflected by the reflector 13, corrected by the lens 17 and is projected on a screen 18.

The entire optical system design in any specific case depends on the distance to the screen 18, the focal length of the reflector 13 and the distance between the reflector and the picture tube screen 16. Any change in the latter distance necessitates changes in the other dimensions but, as they are invariable in any particular installation it is obvious that the distance between tube screen and reflector must be kept constant. Any error in this distance between reflector 13 and tube screen 16 results in a blurred image and therefore a precise means of adjustment of the tube's axial position must be provided. The tube axis also must be aligned with the optical axis to preserve picture clarity and correct framing, therefore a rocking adjustment of the tube axis in the vertical plane must be provided. This rocking motion must be centered at the optical center of the tube screen 16. For the same reason a rocking adjustment of the tube axis in the horizontal plane about its optical center must be provided. In order to secure vertical and transverse horizontal coincidence between the tube's axis and the optical axis two translatory adjustments must also be provided, one to translate the tube vertically and the other horizontally.

In addition to providing the above five types of tube adjustment, it is desirable to design the tube support in such a way that the operation of insertion or removal of the tube 14 in the barrel 11 does not destroy any of the adjustments and does not interfere with them to such an extent as to necessitate readjustment by reference to the projected picture. This objective is attained in the present invention by making the tube support in two parts, one part associated with the tube and the other part associated with the barrel. In general the above five adjustments are accomplished by means of components in the part associated with the tube, and upon removing the tube from the barrel this part of the support is removed with the tube without disturbance of the adjustments. When the tube with its associated support part is again placed in the barrel, it requires no further adjustment.

Thus a spare tube can be associated with its own adjustable support. At any convenient time this tube and its support can be inserted in the projector, operated therein and its five adjustments made. The tube and adjustable support can then be removed as a unit and preserved for rapid replacement use.

Figure 2:
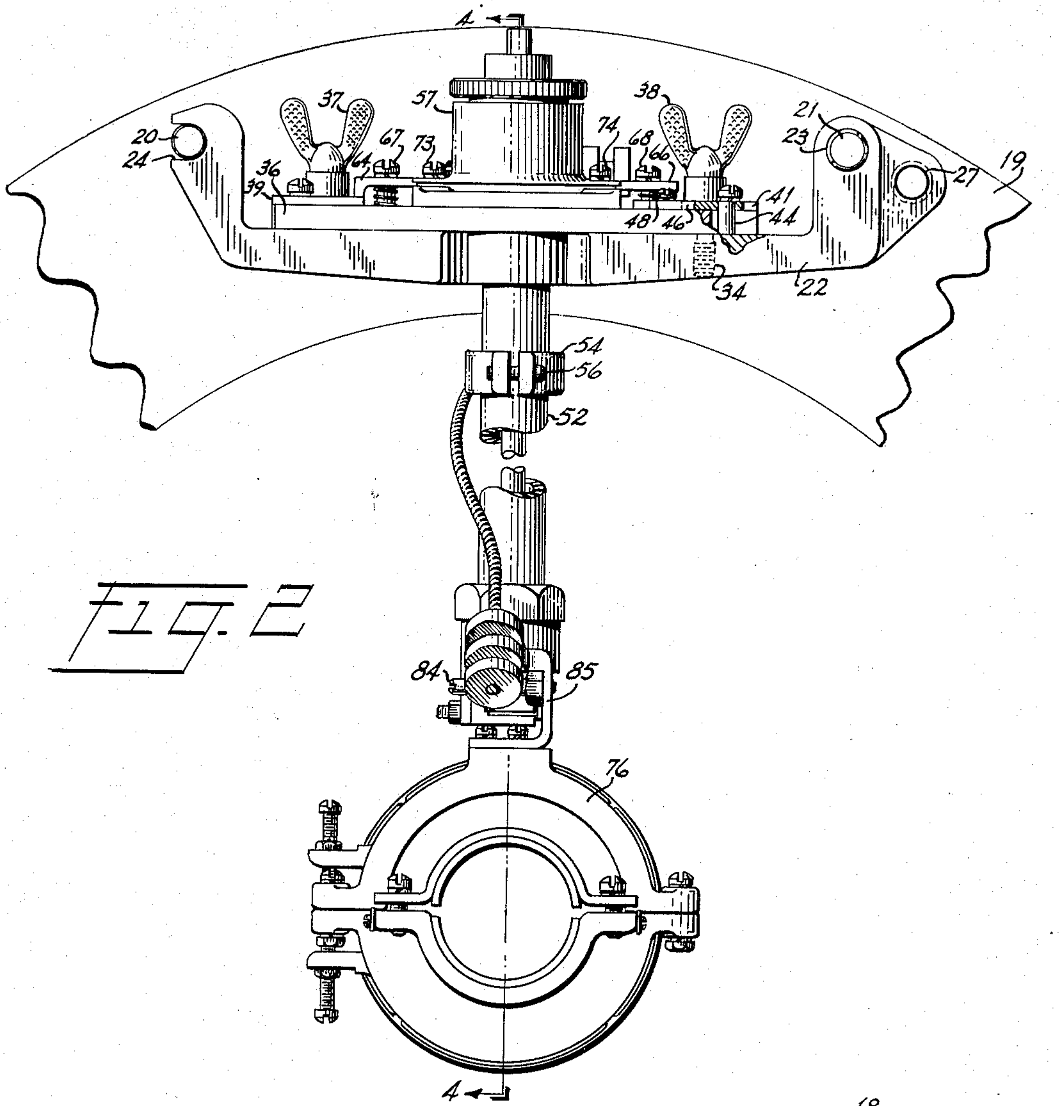
Figure 2 is an elevation view showing a picture tube support and attachment to end ring of barrel, with tube and barrel cylinder omitted.
Figure 3:
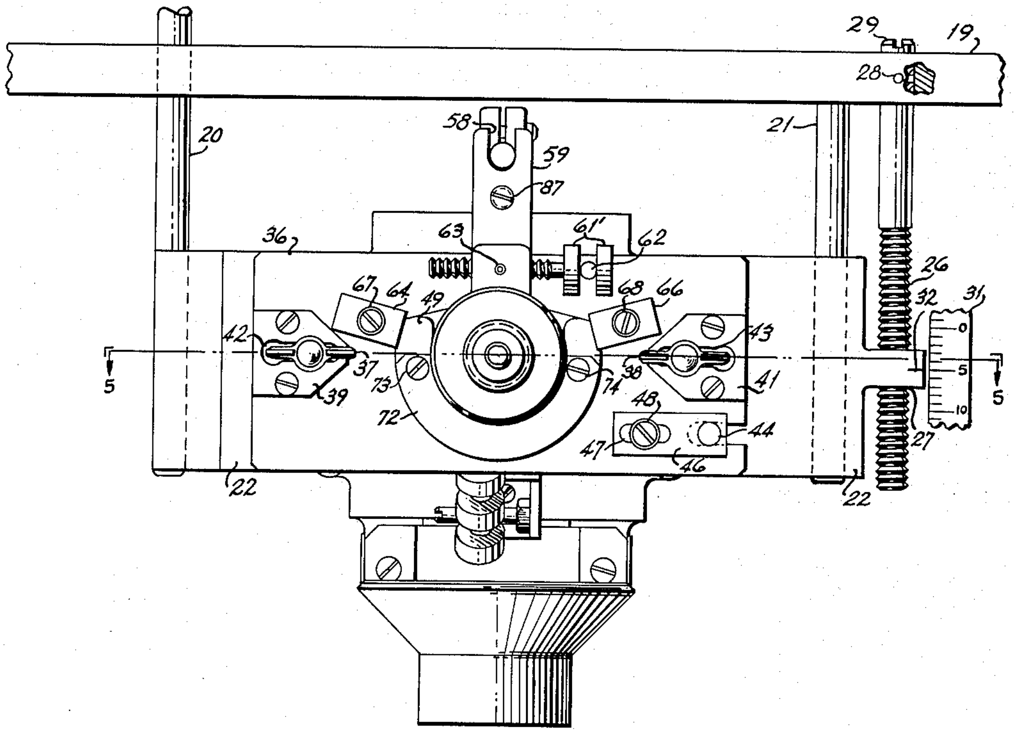
Figure 3 is a plan view showing the picture tube support and attachment to end ring of barrel, with tube and barrel cylinder omitted.

The picture tube 14 is supported from the end ring 19 of the barrel 11. This is more clearly shown in Figs. 2 and 3, in which round rods 20 and 21 are secured in the end ring 19. A U-frame or cradle 22 is slidably supported by the rods 20 and 21, rod 21 sliding in a cylindrical bearing 23 and rod 20 supporting an end of the U-frame 22 by means of a slot 24 in the latter. Thus the U-frame is permitted to slide on the rods but because of the bearing 23 is constrained to slide parallel thereto. Thus since the rods are fixed parallel to the barrel axis, the U-frame movement is also parallel thereto.

Movement of the U-frame as well as locking at any position is accomplished by means of a screw 26 threaded through a tapped hole 27 in the U-frame 22. The screw 26 is secured in the end ring 19 by means of a stud 28 that projects into an annular slot in the screw, and the slotted end 29 of the screw 26 is made accessible from the front of the barrel 11 for the purpose of longitudinal adjustment of the U-frame. A scale 31 and witness mark 32 are provided to indicate the position of the U-frame relative to the barrel.

An adjusting plate 36 is secured on the U-frame 22 by means of two wing screws 37 and 38 threaded into aperture 34. These screws are held captive by two retaining plates 39 and 41. The retaining plates 39 and 41 and also the adjusting plate 36 beneath them are slotted at 42 and 43 so that the wing screws 37 and 38 have a range of possible movement in a direction longitudinally of the adjusting plate 36 but cannot move tranversely. When the adjusting plate 36 is secured to the U-frame 22 it therefore may be fastened in any position within a range of adjustment of about one-half inch.

The U-frame 22 and rods 20 and 21 comprise elements of the tube support associated with the barrel 11, and the adjusting plate 36 and all elements carried thereby comprise elements of the tube support associated with the picture tube 14. The wing screws 37 and 38 comprise the means provided for rapid removal and replacement of a picture tube with its associated support parts.

Transverse translatory adjustment of the picture tube is effected by means of the same wing screws 37 and 38. Locking of this adjustment so as to preserve it during removal and replacement of the tube is effected by means of a pin 44 secured in the U-frame 22, and a plate 46. The plate 46 is provided with a hole that snugly fits pin 44, and with a slot 47 and screw 48 by which the plate can be locked to the adjusting plate 36. When this screw 48 is loosened and the wing screws 37 and 38 are likewise loosened, the adjusting plate 36 can be adjusted in a sidewise direction upon the U-frame 22, but when the screw 48 is tightened the adjusting plate 36 is locked against such movement, although by removal of the wing screws 37 and 38 the plate 36 can still be removed from the U-frame.

Figures 4, 5:
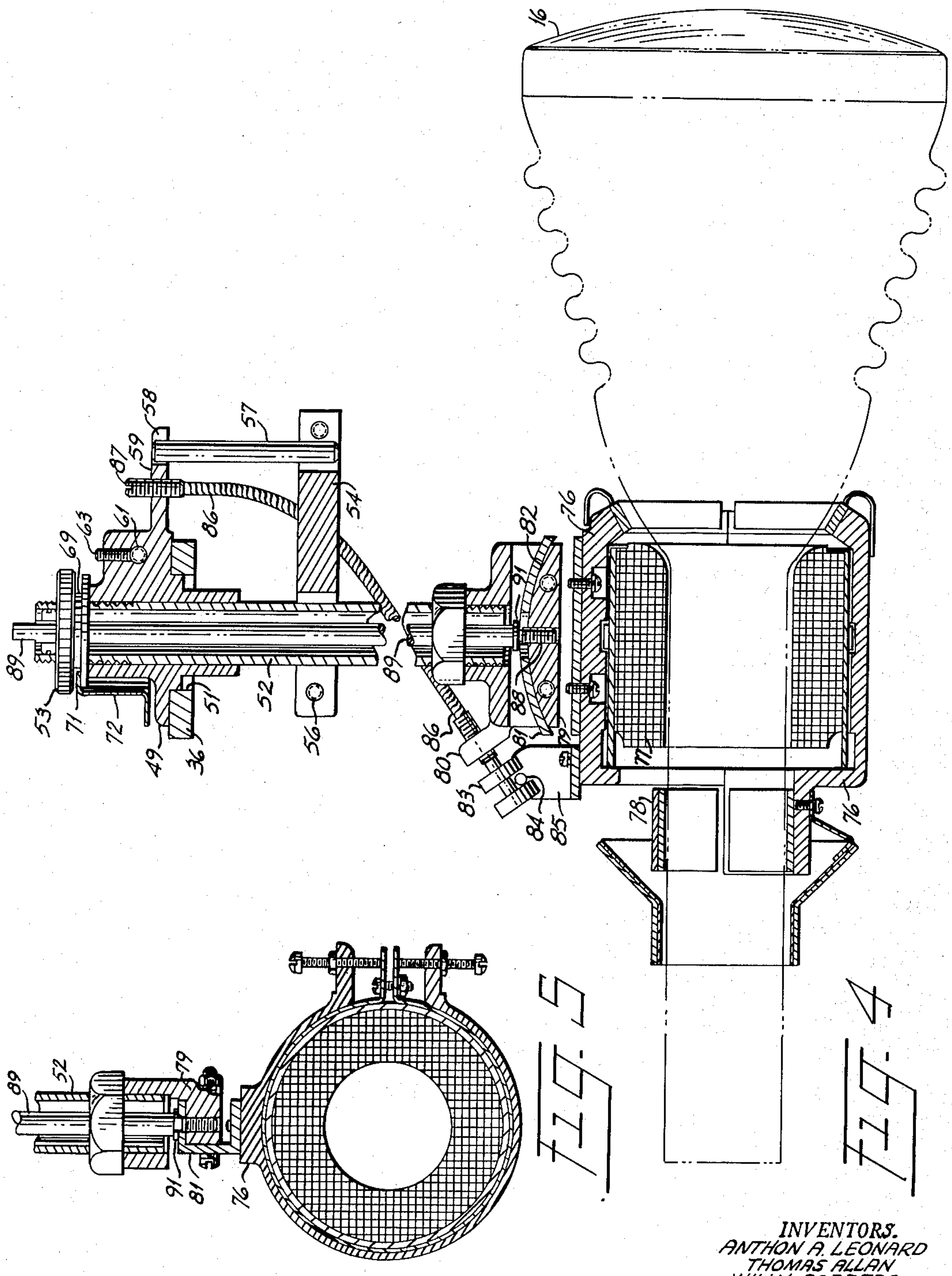
Figure 4 is a side elevation section taken on line 4—4 of Fig. 2 and illustrating the tube in place.
Figure 5 is a partial elevation section taken on line 5—5 of Fig. 3.

Referring to Fig. 4, the midsection of the adjusting plate 36 is provided with a circular aperture 51 in which a depending boss 50 of a shaft support 49 is fitted so that the hollow shaft support 49 can rotate about its axis in the adjusting plate 36. A hollow shaft 52 threaded at its upper end is supported by means of a threaded knurled nut 53 resting in turn on the upper end of the hollow shaft support 49. A split clamp 54 is clamped by means of clamping screw 56 around the hollow shaft 52, and the clamp 54 carries a vertical rod 57 which also engages a fork 58 provided in an arm extension 59 formed integral with the hollow shaft support 49.

An adjusting screw 61 extending through a thickened portion of the arm 59 of the shaft support 49 is provided with a pair of spaced head portions 61' (Fig. 3) separated by an annular groove. A pin 62 affixed to and projecting upwardly from the adjusting plate 36 is engaged in this annular groove. A locking screw 63 serves to lock the adjusting screw 61 in any desired position of adjustment.

Thus any motion of the screw 61 produces relative motion between the adjusting plate 36 and the hollow shaft support 49. This relative motion is communicated from the hollow shaft support 49 through the arm 59 and fork 58, rod 57 and clamp 54 to the hollow shaft 52 resulting in a rotation of the shaft 52 about its axis. This adjustment, in addition to being locked by the locking screw 63, is locked by two dogs 64 and 66, Fig. 3, secured by screws 67 and 68 to the adjusting plate 36, each bearing at one end on the hollow shaft support 49.

Vertical motion of the hollow shaft 52, Fig. 4, relative to support 49 is produced by rotation of the knurled nut 53. The knurled nut 53 contains an annular slot 69 in which fits a lip 71 of a clamp 72. This clamp 72 is secured to the hollow shaft support 49 by means of two screws 73 and 74, Fig. 3, and has such dimensions that when these screws are tightened the lip 71 causes the knurled nut 53 to bear against the upper end of the hollow shaft support 49, and rotation of the nut 53 will result in axial movement of the shaft 52 threaded therein in one direction or the other.

The hollow shaft 52 supports the deflection coil frame 76 and its enclosed deflection coil 77, Fig. 4. The deflection coil frame 76 together with the tube support bracket 78 act to support the picture tube 14. In order to adjust the angular direction of the tube axis in the vertical plane the lower end of the hollow shaft 52 is terminated in a member 79, Fig. 5, having a convex cylindrical surface, and the upper portion of the deflection coil frame at 81 forms a complementary concave cylindrical surface, the two surfaces meeting in the curved plane 82, Fig. 4. This curved plane has its center of curvature in the axial line of the picture tube 14, so that movement of the member 81 together with its associated elements, relative to member 79, tilts the tube 14 in the longitudinal vertical plane of the barrel around the point of intersection of the tube axis and the axis of hollow shaft 52. The tube supports are so designed that the center of curvature of the tube's fluorescent screen 16 is at the axis of the hollow shaft 52 and therefore coincides with the center of curvature of the curved plane 82.

Movement of the member 81 relative to the member 79 is effected through the medium of a double headed screw 83 threaded through a lug 80 formed integral with the member 79. A pin 84 affixed to a bracket 85 fastened to the frame 76 is engaged between the heads of the screw 83 so that any longitudinal movement of the screw 83 causes the frame 76 to be rocked about on axis transverse thereto. The screw 83 is connected by means of a flexible shaft 86 to an adjusting screw 87 threaded into arm 59. This adjustment is locked by the screw 88 tapped into member 79 and rotated by the integral shaft 89 projected through the hollow shaft 52 and accessible from above its upper end. Tightening of the screw 88 clamps its flange 91 against the member 81, pressing it against member 79, and thus locking this adjustment of the picture tube.

In the use of this invention, for example, in a projection television receiver, a spare tube is clamped in a spare support of the described type including all of the elements shown in Fig. 4. This tube and its support are installed in a projection barrel by screwing the wing screws 37 and 38 into the U-frame 22. Without energizing the tube, the barrel is then aimed or "bore sighted" at a projection screen positioned at the designed distance. The projection screen is then brightly illuminated, for example, by a flood lamp positioned to produce even illumination, and a small image of the screen is produced by reflection from the reflector 13 on the face of the unenergized cathode ray tube.

By observation of this image and by adjustment of the five tube translational and rotational adjustments, the image is caused to be sharp at all points of its periphery. The operation of the tube in the normal way will then produce a sharp image at all points on the projection screen.

In general, in the above adjustment procedure, the longitudinal adjustment is initially made by actuation of the screw 29 to produce a sharp image at some point on the tube face, and is used throughout the procedure to refine the focus. The transverse translational adjustment is next made by sliding the adjusting plate 36 in relation to the U-frame 22 until the left and right vertical edges of the image are equally sharp, then locking by means of screw 48 and wing screws 37 and 38. The horizontal adjusting screw 61 is next adjusted until the image is centered horizontally on the face of the tube and clamping screws 67 and 68 are tightened. The image is then centered in the vertical direction by rotating screw 87, then locked by means of screw 88 and rod 89. Lastly the tube is moved bodily up or down by rotating the knurled nut 53 until the top and bottom edges of the image are in equally good focus.

After the tube support has been thus adjusted, all adjustments locked and a record made of the position of the witness mark 32 on its scale 31, the tube and support are removed by loosening the wing screws 37 and 38, and kept as a spare for rapid replacement of an operating tube when required. After such replacement only one adjustment is required, that of adjusting to the witness mark 32, and this is accomplished by reference to the record previously made, and without necessity for repeating the above adjustment procedure.

What is claimed is:

1. A cathode ray tube mounting comprising, an optical barrel provided with an optical system and a frame affixed therein, a removable cathode ray tube assembly supporting a cathode ray tube mounted thereon, means for removably supporting said removable assembly on said frame with said cathode ray tube in cooperative relation with said optical system, means for adjustably positioning said removable assembly in a direction parallel to the axis of said optical system, means carried by said removable assembly for adjustably positioning said removable assembly relative to said frame in a direction transverse to the axis of said optical system, cooperative means carried by said frame and said removable assembly for insuring reengagement thereof in the relative position determined by said transverse adjusting means, means carried solely by said removable assembly for adjustably rotating said cathode ray tube in one plane, means carried solely by said removable assembly for adjustably rotating said cathode ray tube in a second plane normal to said first mentioned plane, and means carried solely by said removable assembly for adjustably positioning said cathode ray tube in a direction normal to said transverse direction of adjustment.

2. A cathode ray tube mounting comprising, an optical barrel provided with an optical system and a frame affixed therein, a removable cathode ray tube assembly, a cathode ray tube supported thereby, means for removably connecting said removable assembly on said frame with said cathode ray tube supported in cooperative relation with said optical system, means for adjustably positioning said removable assembly in a direction parallel to the axis of said optical system, means on said frame for indicating the amount of said positional adjustment, means for adjustably positioning said removable assembly in a direction transverse to said optical system, locking means for insuring reinsertion of said removable assembly in said optical barrel in the position determined by said transverse adjusting means, means carried solely by said removable assembly for adjustably rotating said cathode ray tube in one plane, means carried solely by said removable assembly for adjustably rotating said cathode ray tube in a seecond plane normal to said first mentioned plane, and means carried solely by said removable assembly for adjustably positioning said cathode ray tube in a direction normal to said transverse direction of adjustment.

3. A cathode ray tube mounting comprising, an optical barrel provided with an optical system, a pair of rail members secured interiorly of said barrel in fixed parallel relation to each other, a carriage member slidably mounted on said rail members, a removable supporting assembly, a cathode ray tube supported thereby, said removable supporting assembly including a plate member removably attached to said carriage member, means for adjustably positioning said carriage member along said rail members, means for adjustably positioning said plate member on said carriage member in a direction transverse to the direction of adjustment of said carriage member, adjustable locking means on said plate member engaging fixed means on said carriage member insuring reattachment of said plate member and said carriage member in the relative position determined by said transverse adjusting means, means carried solely by said removable assembly for adjustably rotating said cathode ray tube in one plane, means carried solely by said removable assembly for adjustably rotating said cathode ray tube in one plane, means carried solely by said removable assembly for adjustably rotating said cathode ray tube in a plane normal to said first mentioned plane, and means carried solely by said removable assembly for adjustably positioning said cathode ray tube in a direction normal to said plate and carriage members.

4. A cathode ray tube mounting comprising, an optical barrel provided with an optical system, a pair of rail members secured to said barrel in fixed parallel relation to each other, a carriage member slidably mounted on said rail members, means for adjustably positioning said carriage member along said rail members, indicating means for indicating the positional adjustment of said carriage member, a plate member removably attached to said carriage member, means for adjustably positioning said plate member relative to said carriage member in a direction transverse to the direction of adjustment of said carriage member, adjustable locking means on said plate member engaging fixed means on said carriage member for insuring reattachment of said members in the relative position determined by said transverse adjusting means, a cathode ray tube mount attached to said plate member, a cathode ray tube fixedly supported by said mount, means for rotating said mount in a plane parallel to said plate member, means for rotating said mount in a plane normal to said plate member, and means for adjustably positioning said mount in a direction normal to said plate member, said plate member, mount and cathode ray tube being removable from said barrel and carriage member as a unit.

5. A cathode ray tube mounting comprising, an optical barrel provided with an optical system, a pair of rail members secured to said barrel in fixed parallel relation to each other and the axis of said optical system, a carriage member slidably mounted on said rail members, means for adjustably positioning said carriage member along said rail members, indicating means for indicating the positional adjustment of said carriage member, a plate member removably attached to said carriage member, means for adjustably positioning said plate member relative to said carriage member in a direction transverse to the direction of adjustment of said carriage member, cooperative means carried by said carriage member and said plate member for insuring reattachment of said members in the relative position determined by last mentioned adjusting means, a cathode ray tube support secured to said plate member, a cathode ray tube engaged by said support, means for rotating said support in a plane parallel to said plate member, locking means for said last mentioned means, means for rotating said support in a plane normal to said plate member, locking means for said last mentioned means, and means for adjustably positioning said support relative to said plate member in a direction normal thereto, said plate member, support and cathode ray tube being removable from said barrel and carriage member as a unit.

6. A preadjustable support mounting comprising, a fixed frame, a pair of parallel rail members secured to said frame in fixed relation with respect thereto, a carriage member slidably mounted on said rail members, means for adjustably positioning said carriage member along said rail members, a plate member removably attached to said carriage member, means for adjustably positioning said plate member relative to said carriage member in a direction transverse to the direction of adjustment of said carriage member, cooperative means carried by said carriage member and said plate member for insuring the relative positioning of said members in the relationship determined by said transverse adjusting means, a shaft having one end thereof rotatably secured in said plate member and extending in a direction normal thereto, an object supporting member secured to the other end of said shaft, means for adjustably rotating said shaft about its axis, locking means for said last mentioned adjusting means, means for adjustably rotating said object supporting member in a plane which includes the axis of said shaft, locking means for said last mentioned adjusting means, and means for adjusting the distance between said plate member and said object supporting member.

7. A mounting as defined in claim 6 in which said fixed frame is attached to an optical barrel including an optical system and a cathode ray tube is secured in said object supporting member.

8. A preadjusted support mounting comprising, a fixed frame, a pair of parallel rail members secured to said frame in fixed relation with respect thereto, a carriage member slidably mounted on said rail members, means for adjustably positioning said carriage member along said rail members, indicator means on said carriage member and said frame for indicating the positional adjustment of said carriage member along said rail members, a plate removably attached to said carriage member, means for adjustably positioning said plate relative to said carriage member in a direction transverse to the direction of adjustment of said carriage member and for preventing displacement between said carriage member and plate in all other directions, adjustably positioned locking means on said plate cooperating with fixed position means carried by said carriage member for insuring assembly of said carriage member and said plate in the relative position determined by the adjustment of said transverse adjusting means, a hub secured to said plate, a shaft having one end journaled in said hub and having an object supporting member secured to its other end, means for adjustably rotating said shaft about its axis, locking means for locking said shaft in a selected position determined by the adjustment of said last mentioned adjusting means, means for adjustably rotating said object supporting member in a plane passed through the axis of said shaft, locking means for locking said object supporting member in a selected position determined by the adjustment of said last mentioned adjusting means, and means for adjustably positioning said shaft in said hub in a direction longitudinally of the axis of said shaft.

9. A mounting as defined in claim 8 in which said fixed frame is carried by an optical barrel and a cathode ray tube is secured in said object supporting member in cooperative relation with an optical system carried by said optical barrel.

References Cited in the file of this patent

UNITED STATES PATENTS

| | | |
|---|---|---|
| 1,074,120 | Hutton | Sept. 30, 1913 |
| 2,000,497 | Pohl | May 7, 1935 |
| 2,424,513 | Stephan | July 22, 1947 |
| 2,499,579 | Fritsch | Mar. 7, 1950 |
| 2,528,973 | Radman | Nov. 7, 1950 |
| 2,659,827 | Scag | Nov. 17, 1953 |

FOREIGN PATENTS

| | | |
|---|---|---|
| 548,131 | Great Britain | Jan. 5, 1923 |
| 548,564 | Great Britain | Oct. 15, 1942 |